May 4, 1937.  C. T. PFLUEGER  2,079,335

FISH LURE

Filed May 26, 1933

INVENTOR
CHARLES T. PFLUEGER

BY
ATTORNEYS

Patented May 4, 1937

2,079,335

UNITED STATES PATENT OFFICE 2,079,335

FISH LURE

Charles T. Pflueger, Akron, Ohio, assignor to The Enterprise Manufacturing Company, Akron, Ohio, a corporation of Ohio Application May 26, 1933, Serial No. 673,041

2 Claims. (Cl. 43—47)

This invention relates to fish lures, and more especially it relates to fish lures of which the head portion is rotatable relative to the body portion thereof.

The chief objects of the invention are to provide an improved and more durable lure of the character mentioned; to facilitate the removal of weeds that may become wedged between the head and the body portion of the lure; to preserve the fish line from sudden shocks such as might occur if the line were jerked after the lure had become snagged; and to provide a lure construction which will facilitate the disengaging of the lure from a snag.

It is also one of the objects of the invention to construct a bait having a yielding connection for the line incorporated within the bait body. Other objects will be manifest.

Of the accompanying drawing.

Figure 1:
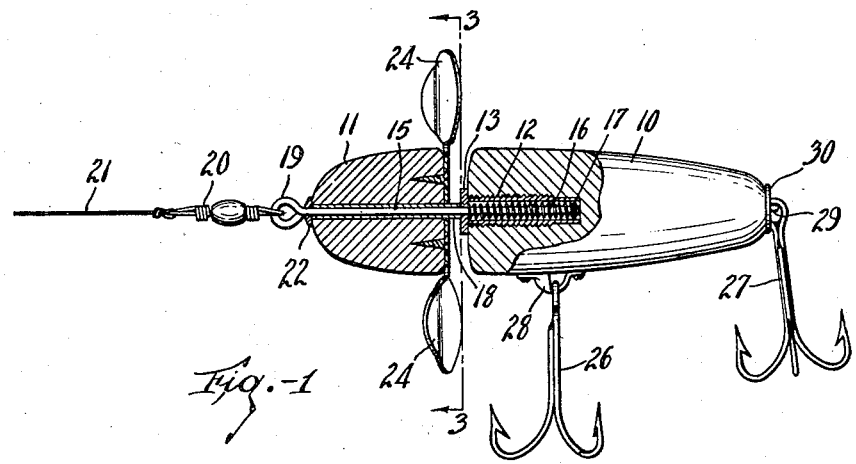
Figure 1 is a side elevation of the lure, in its preferred form, in normal condition, parts being in section.

Referring to the drawing, 10 is the body portion of the lure and 11 is the head portion thereof. The body portion 10 is axially recessed at the front end thereof, and threaded into said recess is a tubular sleeve 12 having a polygonal shaped head 13 at its outer or front end, said head being formed with an axial aperture that is somewhat smaller than the bore 14 of the sleeve. A wire shaft 15 extends through the aperture in the sleeve-head 13, and mounted upon said shaft, interiorly of the sleeve 12, is a compression spring 16 confined between the rear face of the sleeve-head 13 and a washer or head 17 mounted upon the rear end of shaft 15.

Extending axially through the head portion 11 of the lure is a sleeve or bearing bushing 18, the said head portion being journaled upon the front end portion of the shaft 15, which shaft extends through bushing 18. The front end of the shaft 15 is formed with an eye 19 to which is connected the usual swivel 20, the latter providing means for attachment of the lure to a line 21. A washer 22 is mounted upon the shaft 15 between the eye 19 and the front end of head 11. The rear end of bushing 18 projects from the head 11 and normally abuts sleeve-head 13, thus maintaining the head 11 somewhat spaced from the body portion 10.

Secured to the rear face of the head 11 by suitable screws is a propeller comprising integral blades 24, 24 that project each side of said head, and are adapted to impart a rotary or spinning motion to the said head, relatively of the body 10, as the lure is drawn over or through the water. This produces a churn or wake, and simulates the struggling effect produced by a live bird or animal or disabled fish.

The lure is provided with two hooks 26, 27, both of which are mounted upon the rear or body portion thereof, the forward hook 26 being secured to the belly of the lure by a clip or fastener 28 that is so shaped as to prevent the hook from cocking forward sufficiently to become entangled with the propeller blades. The rear or tail hook 27 is mounted at the end of the body portion 10 upon a screw eye 29 that is mounted in a suitable socket or thimble 30. The ring on the hook is sufficiently submerged in said thimble to prevent cocking forward of the tail hook which would entangle it with the belly hook 26.

Figure 2:
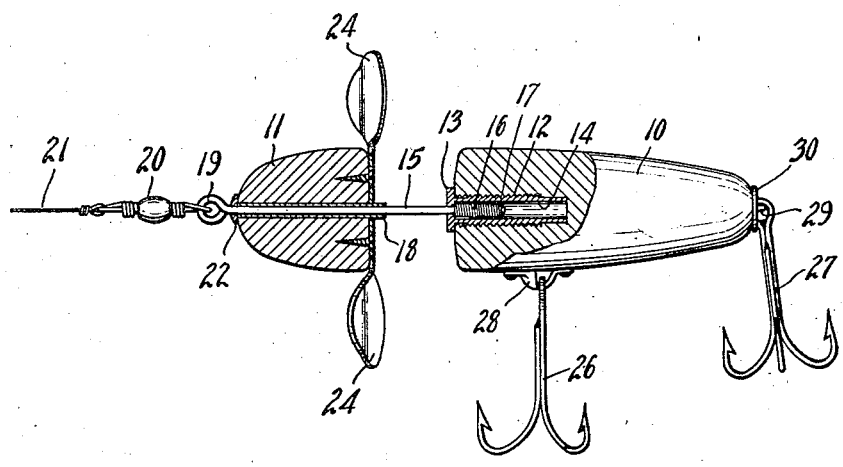
Figure 2 is a view similar to Figure 1 showing the head and body spaced apart to facilitate the removal of weeds from between them.
Figure 3:
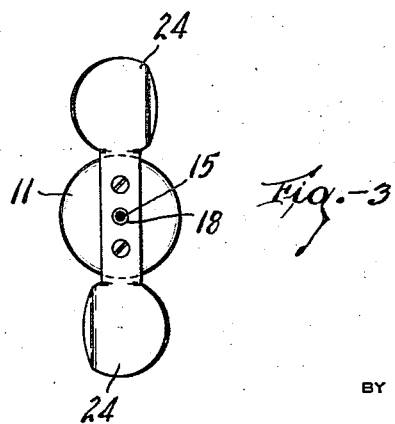
Figure 3 is a section on the line 3—3 of Figure 1.

The head and body portions of the lure are made of light wood so that the lure will float. The arrangement is such that the body 10 and head 11 normally are in the relative positions shown in Figure 1 wherein the head is free to spin freely upon shaft 15. The head and body portions of the lure easily may be relatively widely moved apart, against the force of compression spring 16, as shown in Figure 2, upon occasion such as when it becomes necessary to remove weeds that have become wedged between the head and body.

The arrangement also provides yielding connection of the body 10 to the line 21, whereby sudden shocks to the lure are not transmitted to the line. Also the construction is such that the bait frequently may be removed from a snag simply by pulling the line taut to compress spring 16, and then releasing suddenly. The compression spring 16 is so arranged that it has determinate limited compressibility so that it limits the distance that the head and body may be separated, and a strong pull does not excessively strain or permanently distort it. The shaft is not scored or threaded and, therefore, will not bend or break as easily as those heretofore provided in rotary-head lures.

The lure is more durable than those of similar character heretofore provided, and achieves the several advantages set out in the foregoing statement of objects.

Modification may be resorted to without departing from the spirit of the invention or the scope of the appended claims, which are not limited wholly to the specific construction shown and described. In certain aspects of the invention the form of the body is immaterial, for the shock absorbing feature may be incorporated in or as a part of any bait body.

What is claimed is:

1. A bait structure comprising a body portion having fishhooks thereon and locally formed at its front end with an axial recess, a tubular sleeve threaded in said recess and formed with an aperture of reduced size at its forward end, a shaft extending through said aperture and into said sleeve, a compression spring mounted upon the shaft within said sleeve adapted normally to urge said shaft rearwardly, a head journaled on the forward end portion of the shaft, and means for connecting a fish line to the front end of the shaft.

2. A bait structure comprising a body portion having fishhooks thereon and locally formed at its front end with an axial recess, a tubular sleeve threaded into said recess and formed with an aperture of reduced size at its forward end, a shaft extending through said aperture and into said sleeve, a compression spring mounted upon the shaft interiorly of the sleeve adapted yieldingly to urge said shaft rearwardly, a head rotatably mounted on the forward end portion of the shaft, a bushing in said head about the shaft and projecting rearwardly of the head so as to engage the front end of said sleeve, and means for connecting a fish line to said shaft.

CHARLES T. PFLUEGER.